Nov. 4, 1924.

G. R. ADAMS

BORING MACHINE

Filed June 12, 1922

1,514,072

3 Sheets-Sheet 1

Inventor
George R. Adams
By Jack A. Athley
Attorney

Nov. 4, 1924.  
G. R. ADAMS  
BORING MACHINE  
Filed June 12, 1922     3 Sheets-Sheet 2

1,514,072

Inventor  
George R. Adams  
By Jack Ashley  
Attorney

Nov. 4, 1924.
G. R. ADAMS
BORING MACHINE
Filed June 12, 1922
1,514,072
3 Sheets-Sheet 3
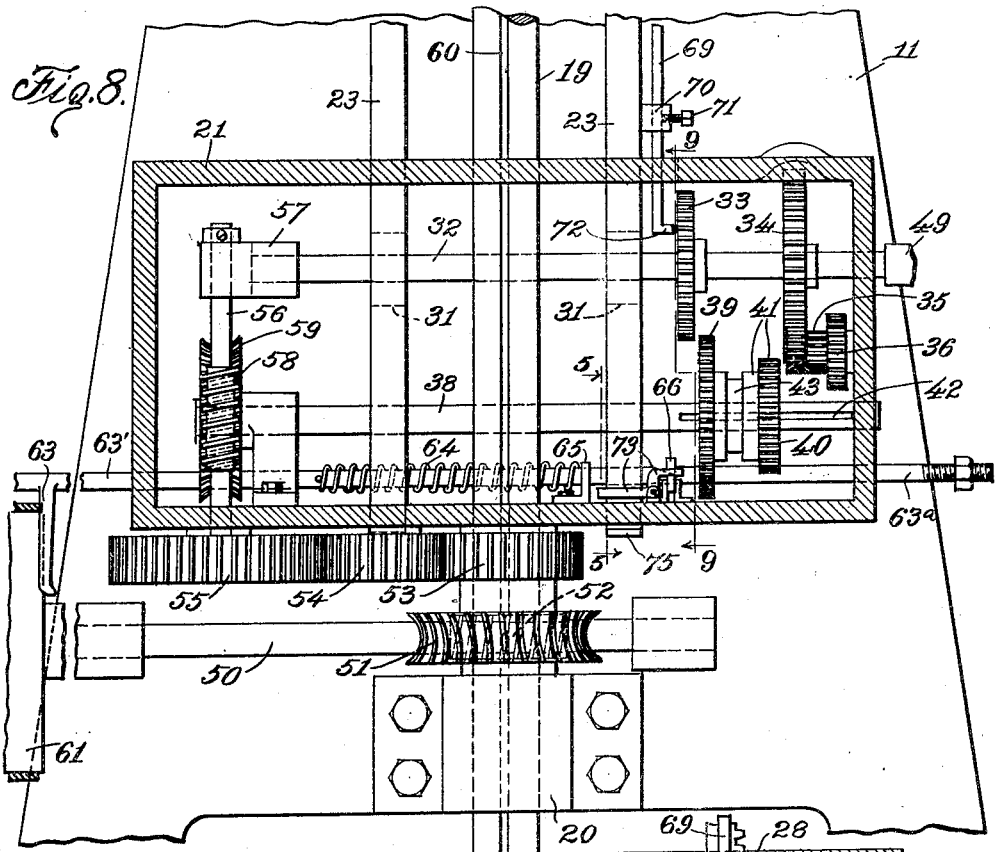
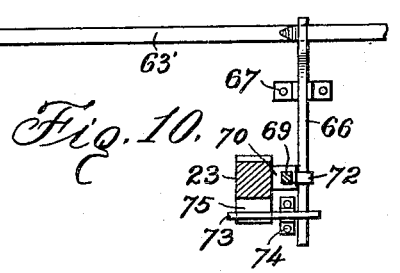
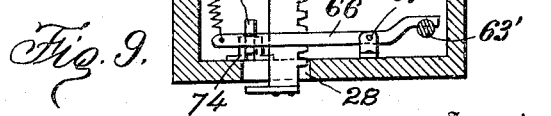
Inventor
George R. Adams
By Jack A. Schley
Attorney Patented Nov. 4, 1924.

1,514,072

UNITED STATES PATENT OFFICE.

GEORGE R. ADAMS, OF HILLSBORO, TEXAS.

BORING MACHINE.

Application filed June 12, 1922. Serial No. 567,667.

*To all whom it may concern:*

Be it known that I, GEORGE R. ADAMS, a citizen of the United States, residing at Hillsboro, in the county of Hill and State of Texas, have invented certain new and useful Improvements in Boring Machines, of which the following is a specification.

This invention relates to new and useful improvements in boring machines, and more particularly to machines for re-boring the cylinders in an engine block.

One of the primary objects of the invention is to provide novel feed mechanism, whereby the boring member may be advanced to the work at different speeds to effect a fine or coarse feed. A particular feature is the provision of a reversing gear in said mechanism, whereby the boring member may also be retracted while rotating so as to remove any irregularities in the work caused by distortion of the boring shaft on its downward movement.

Another object is to provide means for automatically stopping the operation of the machine when the boring member is advanced to a pre-determined point; together with similar automatic stopping means to be actuated when the retracting operation of said member is completed.

A construction designed to carry out the invention will be hereinafter described together with other features of the invention.

Figure 1:
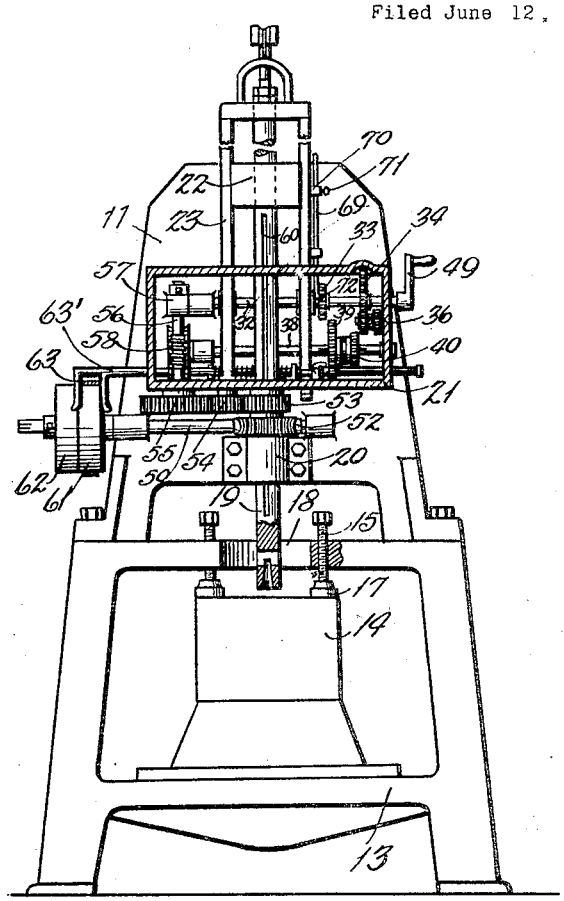
Figure 2:
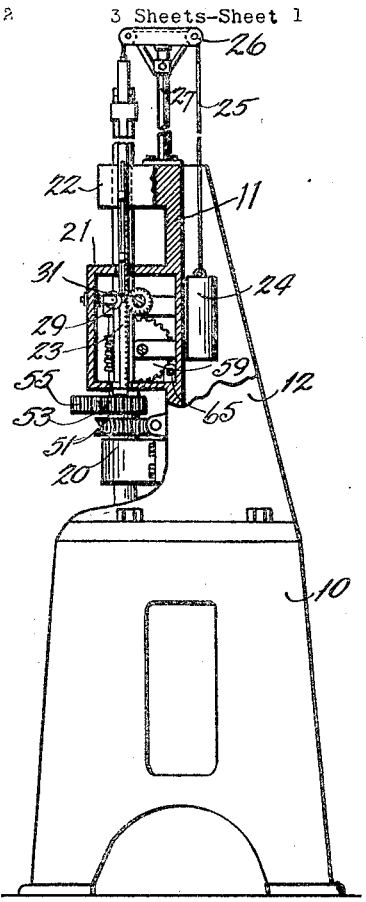
Figure 7:
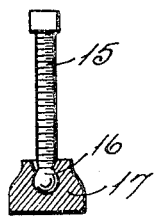
Figure 3:
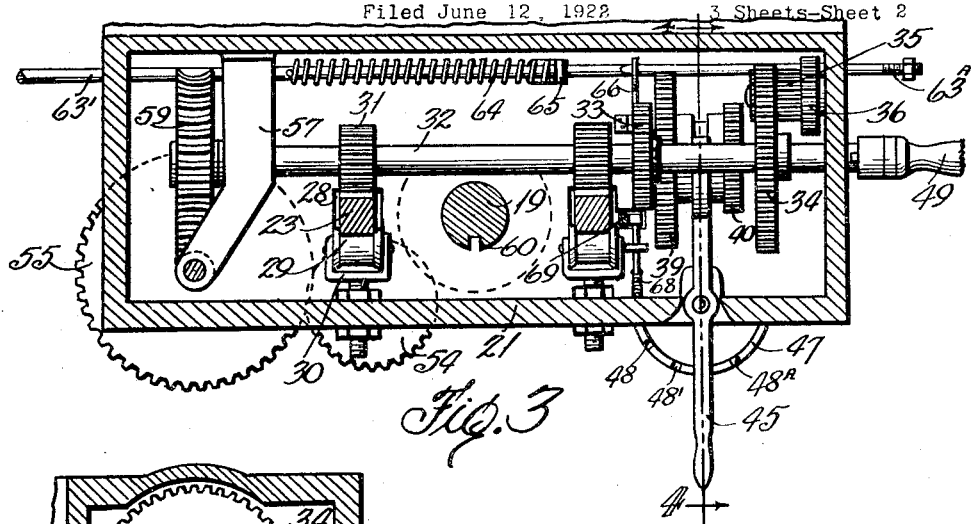
Figure 4:
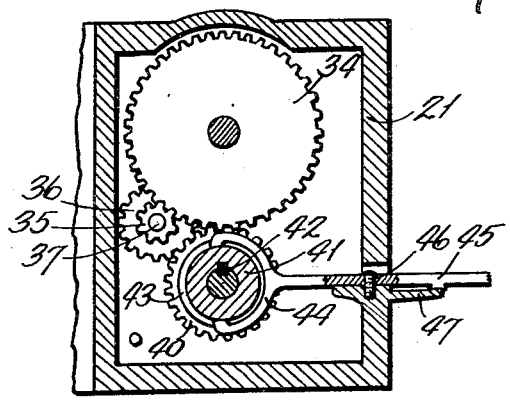
Figure 5:
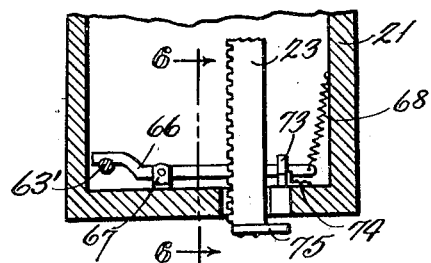
Figure 6:
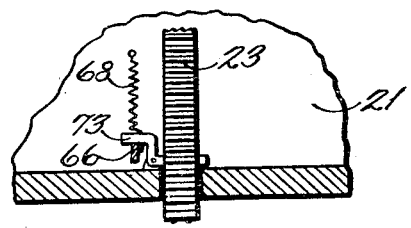

The invention will be more readily understood from a reading of the following specification and by reference to the accompanying drawings, in which an example of the invention is shown and wherein:

Fig. 1 is a front elevation of a machine constructed in accordance with my invention, portions being shown in section, Fig. 2 is a side elevation, a portion of the frame and transmission housing being broken away, Fig. 3 is an enlarged cross section showing the transmission or feed mechanism in plan, Fig. 4 is a sectional view taken on the line 4—4 of Fig. 3, Fig. 5 is an enlarged sectional view taken on the line 5—5 of Fig. 8, Fig. 6 is a sectional view taken on the line 6—6 of Fig. 5, Fig. 7 is an enlarged detail of one of the clamping members, Fig. 8 is a front elevation of a portion of the machine upon an enlarged scale, the housing being shown in section, Fig. 9 is a transverse vertical section on the line 9—9 of Fig. 8, and Fig. 10 is a detail plan view of the means for releasing the belt shifter.

In the drawings the numeral 10 designates a lower frame member which constitutes a substantial support for the machine, and upon which is mounted an upright back 11 which has webs 12 extending rearwardly from each side. The member 10 is provided with a shelf 13 or other means for supporting the cylinder block 14 of an engine, said block being secured in place by a plurality of clamping members. Each clamping member includes a screw 15 which is threaded thru the top of the frame member and provided with a ball 16 on its lower end which fits in the corresponding socket of a foot 17, whereby the foot automatically adjusts itself to the surface of the block. A relatively large opening 18 is located in the central portion of the top of the frame member, thru which the boring member and shaft 19 operate.

The boring shaft 19 extends upwardly thru a bearing 20, a housing 21, bearing 22, and is carried by a pair of rack bars 23 which are yoked together at their upper ends. A counter-balancing weight 24 is connected with the upper ends of the rack bars by means of a flexible connection 25 which engages over a pair of spaced pulleys 26 carried by an upright bracket 27. The rack bars straddle the bearing 22 which serves as a guide therefor, and depend thru slots 28 in the top and bottom of the housing 21. Bearing against the front of the rack bars is a pair of guide rollers 29 carried in brackets 30 adjustably mounted in the front of the said housing, as is best shown in Fig. 3.

The said rack bars are adapted to be driven by a pair of pinions 31 meshing therewith and mounted in spaced relation on a countershaft 32. Mounted on said shaft outwardly of one of the pinions is a fast or coarse feed gear 33, spaced outwardly from which is a slow or fine feed gear 34. The gear 34 is in mesh with a long pinion 35 which is integral with a reversing gear 36 journaled on a stub-shaft 37. Mounted on a main shaft 38 located below the countershaft are sliding gears which include a fast or coarse feed gear 39 and a slow or fine feed gear 40, both of which have a common hub 41. The sliding gears are keyed to the shaft 38 by means of a key-way and spline 42. The hub 41 has a circumferential groove 43 engaging in which is the yoke 44 of a shifter lever 45, which is pivoted on a suitable pin 46 and extends thru the housing 21. The outer portion of the lever bears upon a locking segment 47, which is provided with three adjustment notches 48, 48' and 48ª. As is shown in the drawings the transmission or feed mechanism is in neutral position, no gears being engaged. By swinging the lever 45 to the right, the gears 33 and 39 are slid into mesh, whereby the rack bars 23 and boring shaft 19 are lowered more rapidly and a coarser feed is had. Obversely, when a finer feed is desired the lever is swung to the left and locked in the notch 48', whereby the gears 34 and 40 are engaged and the rack bars and boring shaft are lowered more slowly. When the boring member has been advanced to the desired point in the work, the lever is swung to the extreme left and engaged in the notch 48, whereby the gear 40 is slid past the gear 34 into mesh with the reverse gear 36, which, thru the agency of the pinion 35, drives the gear 34 in a reverse direction and the rack bars and boring shaft are slowly elevated. It will be seen that as the boring member is thus retracted, irregularities occurring from distortion of the boring shaft, are removed by the cutting edges of said member. One end of the shaft 32 extends thru the housing 21 and is provided with a crank handle 49, whereby the boring shaft may be raised or lowered manually to adjust the boring member to the work.

The boring shaft 19 is driven by a worm gearing at the inner end of a drive shaft 50 which is journaled in suitable bearings provided on the back 11. A gear 51 is mounted on the shaft 19 above the bearing 20 and is driven by a worm or screw 52 on the inner end of the shaft 50. Mounted above the gear 51 on the shaft 19 is a spur gear 53, meshing with an intermediate gear 54 which is in engagement with a gear 55 on the lower end of a vertical shaft 56, the upper end of which is journaled in a suitable bearing bracket 57 within the housing 21. The said shaft carries a worm 58 which drives a worm gear 59 on one end of the main shaft 38, whereby motion is transmitted to the rack bars 23 when the transmission gears are engaged. The gears 52 and 53 are provided with suitable keys engaging in a longitudinal groove 60 in the boring shaft 19, thereby keying said gears to the shaft and permitting of the vertical movement of the latter. The outer end of the shaft 50 is provided with a fast and a loose pulley, 61 and 62, respectively, which may be driven by means of a belt from any suitable source of power.

It is pointed out that a particular feature of the invention is to provide means for automatically stopping the operation of the machine when the boring member has been advanced to a pre-determined point, as well as when said member has completed its retracting operation. In carrying out this feature I provide a belt shifter composed of a fork 63 and an elongated rod 63' extending at right angles thereto thru the housing 21. Confined on the rod is a coiled compression spring 64 having one end fixed to said rod and the other end abutting an angular bracket or lug 65 upstanding from the bottom of the housing and thru which said rod is passed. As is best shown in Figs. 5, 8 and 10, a notch is provided in that portion of the rod 63' opposite the coiled spring 64. An elongated latch 66 is pivoted off center in a bracket 67 secured to the bottom of the housing and its short arm is adapted to engage in the said notch to hold the belt shifter against the tension of the compression spring 64, whereby the belt is held upon the fast pulley 61 and the machine is in operation. Secured to the opposite end of the latch 66 is a coiled spring 68, which has one end fastened to the housing and which normally holds the short arm of the latch in said notch. A rod 69 is threaded thru a pair of spaced eyes 70 provided on the outer side of the adjacent rack bar 23 and is adjustable vertically by means of a set screw 71 in one of said eyes. The lower end of the rod is bent at right angles to provide an outwardly directed foot 72 which is in position to abut the long arm of the latch 66 when the rack bars are lowered. By such abutment the short arm of the latch is raised out of the notch in the shifter rod 63', thereby releasing the tension of the spring 64 which displaces said rod, whereby the belt is shifted onto the loose pulley 62 and the machine is stopped. It will be seen that the rod 69 may be adjusted so that the foot 72 will abut the latch when the boring member is advanced to a certain point, whereby the operation of the machine will automatically cease.

To effect the retracting operation of the boring member, it is pointed out that the lever 45 is swung into the notch 48 thereby engaging the reversing gears of the transmission or feed mechanism. It will be seen that the shifter rod 63' has a free end 63ª which projects thru the housing. The belt is shifted onto the fast pulley 61 by pulling the end 63ª of said rod outwardly, which at the same time compresses the spring 64 and causes the latch 66 to engage in the notch in said rod. A bell-crank lever 73 is pivoted in a bracket 74 in the bottom of the housing and has one arm bent at right angles to itself as is shown in Figs. 5 and 6. The angular arm of said lever engages over the long arm of the latch 66 near the end thereof. The other arm of the bell-crank is disposed in the path of a foot 75 on the lower end of the adjacent rack bar. It will be seen that as the lower end of the rack bar is retracted into the housing the foot 75 engages the underside of the straight arm of the bell-crank, causing the angular arm thereof to depress the long arm of the latch 66 whereby the shifter rod 63' is released and is displaced by the action of the spring 64, thereby shifting the belt onto the loose pulley 62 and stopping the operation of the machine.

Various changes in the size and arrangement of the different parts, as well as modifications, may be made without departing from the spirit of the invention.

What I claim, is:

1. In a boring machine, a boring shaft, a rack bar connected thereto, a gearing for advancing or retracting said rack bar and shaft, a drive shaft for actuating said gearing, fast and loose pulleys on said drive shaft, a belt shifter, means to automatically move said shifter to maintain a belt upon the loose pulley, an engaging member for holding said shifter, and belt under tension upon the fast pulley, and means carried by said rack bar for tripping said member in the travel of the rack bar in one direct to permit an automatic shifting of the belt.

2. In a boring machine, a boring shaft, a rack bar connected thereto, gearing for advancing and retracting said rack bar and shaft, a drive shaft, fast and loose pulleys on said drive shaft, a belt shifter, tensioned means normally tending to move said shifter to hold a belt on the loose pulley, releasable means for holding said tensioned means with the shifter in retracted position to hold the belt on the fast pulley, means on the rack bar for tripping the releasable holding means when the boring shaft is fully retracted, and other means on said rack bar for tripping the said releasable means when the boring shaft has been advanced a predetermined distance.

3. In a boring machine, a work support, a frame carrying a vertically disposed boring shaft and rack bar connected thereto, a drive shaft geared to rotate the boring shaft, a countershaft having a pinion meshing with said rack bar, change speed and reverse gearing connected intermediate said drive and counter shafts, means for shifting said gearing to change the speed of travel of said rack or the direction of movement thereof, a device for shifting the power applied to said drive shaft, means for automatically moving said device into non-driving position, an engaging member for holding said moving means under tension in driving position, and means carried by the rack bar in its travel for tripping said engaging member to permit automatic movement of the power shifting device into non-driving position.

In testimony whereof I affix my signature.

GEORGE R. ADAMS.